3,284,493
PROCESS FOR THE CONVERSION OF METHYL-SUBSTITUTED BENZENE COMPOUNDS TO CARBOXYLIC ACIDS
Sheldon Chibnik, Plainfield, N.J., assignor to Mobil Oil Corporation, a corporation of New York
No Drawing. Filed Oct. 7, 1963, Ser. No. 314,498
7 Claims. (Cl. 260—524)

This invention relates to the catalytic oxidation of aromatic compounds. In one particular aspect, it provides a process for the conversion of suitable methyl-substituted benzene compounds to benzene carboxylic acids.

Earlier studies in this field have given rise to a variety of processes for the liquid phase oxidation of alkylated benzene compounds in the presence or absence of a solvent by means of air or oxygen using various metals or salts as catalysts. A number of classes of organic compounds, particularly peroxides, aldehydes, and ketones, have been proposed as reaction initiators and/or activators.

The present invention is based on the discovery that methyl-substituted benzene compounds may be oxidized to the corresponding benzene carboxylic acid using 2-butanol as the activator in the presence of a soluble cobalt catalyst. In general, the present invention relates to the use of a small amount of 2-butanol as an activator in processes for preparation of benzene carboxylic acids by contacting, with a free oxygen-containing gas, a solution of a methyl-substituted benzene compound in a lower fatty acid containing a cobalt salt of a lower fatty acid and water. More specifically, the invention relates to such processes for preparation of terephthalic acid from p-xylene and in which the fatty acid solvent is acetic acid, and the cobalt salt is cobalt acetate.

In carrying out a particularly suitable embodiment of the process of my invention, the methyl or polymethyl substituted benzene compound to be oxidized is dissolved in a saturated fatty acid having from 2 to 4 carbon atoms. Acetic acid alone is the preferred solvent, but a mixture of such acid, i.e., acetic, propionic, and/or butyric acids, may also be employed. The reactant methyl-benzene compound is generally present in an amount ranging from 2 to 20%, preferably about 10%, by weight of the fatty acid solvent. The 2-butanol activator is preferably present in a concentration of at least 1% and up to 10% by weight of the fatty acid solvent.

The oxidation reaction is catalyzed by a soluble cobalt salt present in the reaction mixture as the cobalt lower alkanoate salt corresponding to the fatty acid solvent employed, i.e., cobalt acetate, propionate or butyrate or mixtures thereof, in an amount corresponding to 0.1 to 1% by weight of cobalt metal based on the weight of fatty acid solvent.

In order to secure a rapid and efficient oxidation, the amount of water initially present in the reaction mixture is generally in the range of about 1 to 10% by weight of the reaction mixture. When the water content is less than 1% or greater than about 10%, a high speed oxidation is generally not obtained and the conversion of more than half the starting methyl-benzene compound to the desired carboxylic acid may require extended reaction periods of many hours up to several days.

The oxidation is effected by contacting the reaction mixture with a gas containing molecular oxygen, preferably at partial pressures of oxygen ranging from about 100 to 1,000 pounds per square inch, and more preferably in the range of about 200 to 700 pounds per square inch. Lower pressures may be employed in order to moderate the oxidation reaction when a highly reactive starting material, such as pure m-xylene or pure p-xylene, is the reactant or when high concentrations of activator are present. Higher pressures are advantageous in speeding up the reaction when that is desirable. While air, or air enriched with oxygen, may be used to advantage, gaseous oxygen of commercial purity is preferred. Superior results are obtained at reaction temperatures of about 130° C. and very good results are obtained at reaction temperatures between 125 to 140° C. as the yield of desired product falls off at temperatures above 140° C. and particularly above about 145° C.

Under the optimum conditions described above, the desired oxidation occurs rapidly, generally within a few minutes, with a high degree of conversion of the reactant methyl-benzene compound to the desired benzene carboxylic acid product. The reaction time is most usually controlled so as not to exceed the period required for a predetermined degree of oxidation, generally about 30% to 50% of the starting material. However, it may be desirable under certain circumstances to extend the reaction period to about an hour or two in order to accomplish higher conversions of starting materials in a given oxidation. After the benzene carboxylic acid product has been isolated, the reaction mixture residue can be readjusted to the proper composition and re-used for further oxidation. This is done usually by adding the necessary amount of the reactant methyl-substituted benzene compound and the 2-butanol activator. On occasion, it may be necessary to remove excess water.

Accordingly, in particularly preferred aspects, the present invention is directed to a process for preparing benzene carboxylic acids which comprises the steps of (a) providing a solution of a methyl-substituted benzene compound in a lower fatty acid having two to four carbon atoms and containing about 2 to 20% of said methyl-substituted benzene compound and at least 1% of 2-butanol by weight of said fatty acid, said solution containing a cobalt salt of a lower fatty acid having 2 to 4 carbon atoms in an amount corresponding to about 0.1 to 1.0% cobalt by weight of the fatty acid and having an initial water content of about 1 to 10% by weight; (b) contacting the said solution at a temperature between about 125 and 140° C. with a gas containing molecular oxygen at a partial pressure of oxygen at a partial pressure of oxygen of about 100 to 1,000 pounds per square inch; and (c) continuing the reaction until about 30 to 95% of the methyl-substituted benzene compound has been oxidized to the corresponding benzene carboxylic acid.

The invention is further illustrated by the following examples:

EXAMPLE 1

A one-gallon stirred autoclave was charged with 106 grams of p-xylene, 25 grams cobalt (II) acetate tetrahydrate, 22.2 grams of 2-butanol and 1,000 milliliters of glacial acetic acid and heated to 130° C. under a pressure of 250 pounds per square inch of oxygen. Oxygen absorption started within 15 minutes and the temperature was maintained below 140° C. by cooling the reactor. No further oxygen was absorbed after two hours. The hot reaction mixture was filtered and the precipitate washed with hot acetic acid and water. The filtrate, after reconstitution with the necessary amounts of activator and reactant methyl-substituted benzene compound was returned to the oxidation step. The yield of terephthalic acid was 128.8 grams, or 77.6% of the theoretical.

EXAMPLES 2–10

A series of experiments were run in exactly the same manner as described in Example 1 except that an equimolar amount of the indicated alcohol was substituted for the 2-butanol. The results are summarized in Table I which also includes a control having no alcohol added and the results of Example I for ready comparison.

Table I

| Run # | Alcohol | Terephthalic Acid | |
|---|---|---|---|
| | | Yield in Grams | Percent Yield |
| 1 | None | 62.1 | 37.8 |
| 2 | Methanol | 63.3 | 38.1 |
| 3 | Methanol | 61.9 | 37.3 |
| 4 | n-Butanol | 60.8 | 36.6 |
| 5 | t-Butanol | 56.0 | 33.7 |
| 6 | 2-propanol | 50.2 | 30.2 |
| 7 | Ethanol | 66.3 | 39.9 |
| 8 | 4-methyl-2-pentanol | 57.9 | 34.8 |
| 9 | 2-methyl-2-butanol | 58.1 | 35.0 |
| | 2-butanol (Example 1) | 128.8 | 77.6 |

The uniqueness of 2-butanol as an activator in the described process, as compared with the other lower alkanols, is apparent from Table I. Other alcohols, or a control having no alcohol added, give yields of terephthalic acid ranging roughly from 30 to 40% of the theoretical, or about that obtained with no activator; whereas better than 75% of the theoretical, or about double the yield, is obtained using 2-butanol as the activator.

The process of this invention is applicable to the oxidation of benzene compounds having one or more methyl groups substituted in the benzene nucleus, and results in the formation of benzene carboxylic acids by the oxidation of the methyl groups to carboxylic acid groups. Typical starting materials are the methyl-substituted benzenes such as toluene, m-xylene, p-xylene, or mixtures containing such compounds. The methyl-benzene starting material may also contain other nuclear substituents inert to the oxidation reaction, such as chlorine, bromine, fluorine, nitro, carboxyl, alkoxy, aryloxy, or tertiary alkyl groups. The process of the present invention is particularly applicable to the preparation of dicarboxylic acids. Typical oxidations include that of toluene to benzoic acid, m-xylene or m-toluic acid to isphthalic acid, p-xylene or p-toluic acid to terephthalic acid, 1,5-dimethyl-2-chlorobenzene to chloro-terephthalic acid, and 1,4-dimethyl-2-nitrobenzene to nitroterephthalic acid. The process of the present invention is especially advantageous when the desired dicarboxylic acid is insoluble in the reaction medium and can be separated by filtration, the monocarboxylic acid and other intermediate oxidation products remaining in solution where their further oxidation proceeds at a relatively high rate.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A process for preparing benzene carboxylic acids which comprises the steps of (a) providing a solution of a methyl-substituted benzene compound in a lower fatty acid having two to four carbon atoms and containing about 2 to 20% of said methyl-substituted benzene compound and at least 1% of 2-butanol by weight of said fatty acid, said solution containing a cobalt salt of a lower fatty acid having 2 to 4 carbon atoms in an amount corresponding to about 0.1 to 1.0% cobalt by weight of the fatty acid and having an initial water content of 1 to 10% by weight; (b) contacting the said solution at a temperature between about 125 and 140° C. with a gas containing molecular oxygen at a partial pressure of oxygen of about 100 to 1,000 pounds per square inch; and (c) continuing the reaction until about 30 to 95% of the methyl-substituted benzene compound has been oxidized to the corresponding benzene carboxylic acid.

2. A process for preparing benzene carboxylic acids which comprises the steps of (a) providing a solution of a methyl-substituted benzene compound in a lower fatty acid having two to four carbon atoms and containing about 2 to 20% of said methyl-substituted benzene compound and at least 1% of 2-butanol by weight of said fatty acid, said solution containing a cobalt salt of a lower fatty acid having 2 to 4 carbon atoms in an amount corresponding to about 0.1 to 1.0% cobalt by weight of the fatty acid and having an initial water content of 1 to 10% by weight; (b) contacting the said solution at a temperature between about 125 and 140° C. with a gas containing molecular oxygen at a partial pressure of oxygen of about 100 to 1,000 pounds per square inch; (c) continuing the reaction until about 30 to 95% of the methyl-substituted benzene compound has been oxidized to the corresponding carboxylic acid; (d) separating the resultant benzene carboxylic acid from the reaction mixture; and (e) reconstituting the reaction mixture by adding the necessary amounts of the methyl-substituted benzene compound and 2-butanol.

3. A process for preparing benzene dicarboxylic acids which comprises the steps of (a) providing a solution of a dimethyl-substituted benzene compound in a lower fatty acid having two to four carbon atoms and containing about 2 to 20% of said dimethyl-substituted benzene compound and at least 1% of 2-butanol by weight of said fatty acid, said solution containing a cobalt salt of a lower fatty acid having 2 to 4 carbon atoms in an amount corresponding to about 0.1 to 1.0% cobalt by weight of the fatty acid and having an initial water content of 1 to 10% by weight; (b) contacting the said solution at a temperature between about 125 and 140° C. with a gas containing molecular oxygen at a partial pressure of oxygen of about 100 to 1,000 pounds per square inch; and (c) continuing the reaction until about 30 to 95% of the dimethyl-substituted benzene compound has been oxidized to the corresponding benzene dicarboxylic acid.

4. A process for preparing terephthalic acid which comprises providing an about 10% by weight solution of p-xylene in acetic acid, said solution containing at least 1% of 2-butanol by weight of the acetic acid and cobalt acetate in an amount corresponding to about 0.1 to 1.0% cobalt by weight of the acetic acid and having an initial water content of 1 to 10% by weight; contacting the said solution at a tempearture of about 130° C. with a gas containing molecular oxygen at a partial pressure of oxygen of about 100 to 1,000 pounds per square inch; and continuing the reaction until about 30 to 95% of the p-xylene has been oxidized to the terephthalic acid.

5. In a process for preparation of benzene carboxylic acids by contacting with a gas containing molecular oxygen a water-containing solution of a methyl-substituted benzene compound in a lower fatty acid and containing a cobalt salt of a lower fatty acid, the improvement which comprises contacting with the gas containing molecular oxygen a solution as aforedefined but which additionally contains a small amount of 2-butanol based on the weight of the lower fatty acid.

6. A process, as defined in claim 5, wherein the solution contains at least about 1% of 2-butanol based on the weight of the lower fatty acid.

7. A process, as defined in claim 6, wherein the methyl-substituted benzene is p-xylene.

References Cited by the Examiner

UNITED STATES PATENTS

| 2,245,528 | 6/1941 | Loder | 260—524 |
| 2,354,683 | 8/1944 | Hull | 260—596 |
| 2,479,067 | 8/1949 | Gresham | 260—524 |
| 3,036,122 | 5/1962 | Ardis et al. | 260—524 |

LORRAINE A. WEINBERGER, *Primary Examiner.*

R. K. JACKSON, *Examiner.*

S. B. WILLIAMS, *Assistant Examiner.*